United States Patent [19]

Sainton

[11] Patent Number: 5,367,563
[45] Date of Patent: * Nov. 22, 1994

[54] PROGRAMMABLE UNIVERSAL MODEM SYSTEM AND METHOD FOR USING THE SAME

[75] Inventor: Joseph B. Sainton, Allen, Tex.

[73] Assignee: Spectrum Information Technologies, Inc., Manhasset, N.Y.

[*] Notice: The portion of the term of this patent subsequent to Sep. 28, 2010 has been disclaimed.

[21] Appl. No.: 96,895

[22] Filed: Jul. 26, 1993

Related U.S. Application Data

[62] Division of Ser. No. 863,568, Apr. 6, 1992, Pat. No. 5,249,218.

[51] Int. Cl.$^5$ .............................................. H04M 11/00
[52] U.S. Cl. ...................................... 379/98; 379/59; 379/58; 379/63; 379/93
[58] Field of Search ...................... 379/59, 60, 58, 98, 379/97, 96, 94, 93; 375/8

[56] References Cited

U.S. PATENT DOCUMENTS

| | | |
|---|---|---|
| 3,613,004 | 10/1971 | Wycoff . |
| 3,674,935 | 7/1972 | Lawrence . |
| 3,711,777 | 1/1973 | Tink . |
| 3,714,586 | 1/1973 | Mason . |
| 3,714,650 | 1/1973 | Fuller et al. . |
| 3,745,251 | 7/1973 | Fretwell . |
| 3,766,479 | 10/1973 | Thalimer et al. . |
| 3,878,333 | 4/1975 | Shimizu et al. . |
| 3,899,772 | 8/1975 | Mead et al. . |
| 3,974,343 | 8/1976 | Cheney et al. . |
| 4,012,596 | 3/1977 | West, Jr. et al. . |
| 4,025,853 | 5/1977 | Addeo . |
| 4,109,283 | 8/1978 | Rast . |
| 4,284,849 | 8/1981 | Anderson et al. . |
| 4,415,774 | 11/1983 | Driver . |
| 4,419,756 | 12/1983 | Cheng-Quispe et al. . |
| 4,425,665 | 1/1984 | Stauffer . |
| 4,519,068 | 5/1985 | Krebs et al. . |
| 4,568,800 | 2/1986 | Orikasa . |
| 4,577,182 | 3/1982 | Millsap et al. . |
| 4,658,096 | 4/1987 | West, Jr. et al. . |

FOREIGN PATENT DOCUMENTS

| | | |
|---|---|---|
| 0309627 | 4/1905 | European Pat. Off. . |
| 0295146 | 6/1988 | European Pat. Off. . |
| 2170977 | 2/1986 | United Kingdom . |
| 8700718 | 1/1987 | WIPO . |
| 8905553 | 6/1989 | WIPO . |
| 9003076 | 3/1990 | WIPO . |

OTHER PUBLICATIONS

Morrison & Dempsey Communications, "AB3X Cellular Interface Owner's Manual".
COMPAQ, "SpeedPAQ 144 Modem-Quick Reference".
COMPAQ, "COMPAQ Product Quality Statements".

(List continued on next page.)

Primary Examiner—Curtis Kuntz
Assistant Examiner—Stella L. Woo
Attorney, Agent, or Firm—Sixbey, Friedman, Leedom & Ferguson

[57] ABSTRACT

A system including a portable computer with a central processing unit and associated software, and a modem with an output jack carrying data transmit (TX), data receive (RX), tip, ring, and programmable digital input-/output (DIO) lines sufficient to facilitate control of a large number of alternative telephone access devices. The operation and functions of the tip, ring, TX, RX and programmable DIO lines are controlled in a preferred embodiment by software in the modem under the control of the software in the computer. In a preferred embodiment, a user operates the software in the computer to specify a type or model of telephone access device being used with the modem, and the RX, TX, tip and ring lines are rendered either operable or inoperable, and a required subset of the programmable DIO lines are caused to operate in a manner necessary to achieve interactive control of an attached telephone access device.

66 Claims, 6 Drawing Sheets

U.S. PATENT DOCUMENTS

| | | |
|---|---|---|
| 4,677,656 | 6/1987 | Burke et al. . |
| 4,680,787 | 7/1987 | Marry . |
| 4,697,281 | 9/1987 | O'Sullivan . |
| 4,718,080 | 1/1988 | Serrano et al. . |
| 4,737,975 | 4/1988 | Shafer . |
| 4,752,949 | 6/1988 | Steinbeck et al. . |
| 4,759,059 | 7/1988 | Christensen . |
| 4,775,997 | 10/1988 | West, Jr. et al. . |
| 4,837,800 | 6/1989 | Freeburg et al. . |
| 4,837,812 | 6/1989 | Takahashi et al. . |
| 4,852,146 | 7/1989 | Hathcock et al. . |
| 4,868,863 | 9/1989 | Hartley et al. . |
| 4,887,290 | 12/1989 | Dop et al. . |
| 4,890,315 | 12/1989 | Bendixen et al. . |
| 4,912,756 | 3/1990 | Hop . |
| 4,972,457 | 11/1990 | O'Sullivan . |
| 4,991,197 | 2/1991 | Morris . |
| 5,127,041 | 6/1992 | O'Sullivan . |
| 5,131,019 | 7/1992 | Sheffer et al. . |
| 5,134,648 | 7/1992 | Hochfield et al. . |
| 5,170,470 | 12/1992 | Pindar et al. ............................ 375/8 |
| 5,202,963 | 4/1993 | Zelley ...................................... 375/8 |
| 5,249,218 | 9/1993 | Sainton ................................. 379/98 |

OTHER PUBLICATIONS

COMPAQ, "SpeedPAQ 144 Modem–About Your Fax Software . . . ".
COMPAQ, "SpeedPAQ 144 Modem–Installation Guide".
COMPAQ, "Speed PAQ 144 Modem–Reference Guide".
COMPAQ, "A. COMPAQ and 121/PT128 Data Application . . . ", Dated Jan. 24, 1993.
*Spectrum Information Technologies, Inc. et al. v. Data Race, Inc.*–Amended Complaint.
*Spectrum Information Technologies, Inc. et al. b. Data Race, Inc.*–Response to Plaintiff's Application For Temporary Restraining Order.
*Spectrum Information Technologies, Inc. et al. v. Data Race, Inc.*–Memo In Support of Plaintiff's Application For Temporary Restraining Order.
*Spectrum Information Technologies, Inc. et al. v. Data Race, Inc.*–Affidavit of Peter Caserta.
*Spectrum Information Technologies, Inc. et al. v. Data Race, Inc.*–Affidavit of Evan R. Smith.
*Spectrum Information Technologies, Inc. et al. v. Data Race, Inc.*–Affidavit of John Rule.
*Spectrum Information Technologies, Inc. et al. v. Data Race, Inc.*–Original Answer and Counter Claims.
*Spectrum Information Technologies, Inc. et al. v. Data Race, Inc.*–Transcript of Proceedings.
Document Cited In U.S. Patent No. 4,654,867 issued Mar. 31, 1987, "Millicom Cellular Portable Telephone Article".
Excerpt from *Digital Fundamentals*, 3d Edition, by Thomas L. Floyd, Copyright 1986, pp. 562–569.
AT&T 208A Data Set product, Jul. 1975, Circuit Description, CD–1D232–01.
"Technical Aspects of Data Communication," John E. McNamara, Jul. 1979, Digital Press.
"A Tale of Two Modems," F. R. Derfler Jr., Aug. 21, 1984, PC Magazine.
"Advanced Mobile PhoneService: Control Architecture," Z. C. Fluhr & P. T. Porter, Bell System Technical Journal, vol. 58, No. 1, Jan. 1979.
"Advanced Mobile Phone Service: A Subscriber Set for the Equipment Test," R. E. Fisher, Bell System Technical Journal, vol. 58, No. 1, Jan. 1979.
"Overview of AMPS Mobile Call Processing System," Robert M. Fuller and Fred A. Epler, 1980 Annual Conference of the IEEE Vehicular Technology Society.
"Advance Mobile PhoneService," F. H. Blecher, IEEE.
"Data Transmission for Mobile Radio," T. Brenig, IEEE Transactions on Vehicular Technology, VT–27, No. 3, Aug. 1978.
"An 800Mhz Approach to Underground Data Communications," T. M. Caridi and P. Mighdoll, IEEE 1981 Industry Applications.
"ARQ Schemes for Data Transmission in Mobile Radio Systems," R. A. Comroe and D. J. Costello, Jr., IEEE Transactions on Vehicular Technology, vol. VT–33, Aug. 1984.
"Optimal Blocklengths for ARQ Error Control Schemes," Joel M. Morris, IEEE Transactions on Communications, vol. COM–27, No. 2, Feb. 1979.
"Data Transmissions Over VHF and UHF Land Mo- (List continued on next page.)

OTHER PUBLICATIONS bile Radio Channels," P. J. Cadman and R. L. Brewster, IEEE Proceedings vol. 130, Part F, No. 6, Oct. 1983.

"Data Signaling Functions for a Cellular Mobile Telephone System," V. Hachenburg, B. D. Holm, and J. I. Smith, IEEE Transactions on Vehicular Technology, vol. VT-26, No. 1, Feb. 1977.

"Quality of Service and Bandwidth Efficiency of Cellular Mobile Radio with Variable Bit-Rate Speech Transmission," D. J. Goodman and C. E. W. Sundberg, IEEE Transactions on Vehicular Technology, vol. VT-32, Aug. 1983.

AT&T's Dimension PBX described in AT&T publication Bell System Practice Section 503-100-103, Issue 3, published Mar. 1981, whichrelates to a multi-button electronic telephone set.

Panasonic's "Easa-Phone" system described in Technical Guide KX-T 30810 for Panasonic's electronic modular switching system; and KX-T 30830 for its associated telephone station.

"R/F Lined Portable Digital Communications System Overview," Proceedings of the National Electronics Conference (1984), Sep. 24-26, Rosemont, Ill., USA, J. Krebs, pp. 402-407.

"Portable Computer and Host Talk Over Radio-Frequency Link" Electronics, vol. 56, Aug. 25, 1983, J. Krebs.

"Cellnet adds data to cellular service," International News Telephone Engineer and Management, Nov. 1, 1985.

"Celldata launched," British Telecom Journal, No. 3, (1985) vol. 6, Autumn.

"Low Bit-Rate Speech Coders Applicable in Mobile Satellite Communications Systems", Neviano Dal Degan and Fulvio Russina, CSELT-Centrol Studi e Laboratori Telecommunicazioni S.p.A.-Via G. Reiss Romoli, 274-10148 Torino, Italy.

PROGRAMMABLE UNIVERSAL MODEM SYSTEM AND METHOD FOR USING THE SAME

This is a divisional application of Ser. No. 07/863,568, filed Apr. 6, 1992, now U.S. Pat. No. 5,249,218.

BACKGROUND OF THE INVENTION

1. Technical Field

The present invention relates to a data transmission system and method which can be selectively used with a landline telephone system or with a variety of alternative telephone systems, particularly radiotelephones.

2. Background Art

In years past, mobile data transmission was difficult in that there was no public carrier capable of selectively connecting widely separated mobile users wishing to exchange data. The first mobile information transmission systems of this type became widely available to the public in the last decade, in the form of cellular radio telephone systems. These cellular telephone systems were primarily designed for voice communications, but inventors working in the field also developed data modems for use with these cellular telephone systems. The first commercially practical modem of this type is disclosed in U.S. Pat. No. 4,697,281 to O'Sullivan, assigned to the assignee of the present application. This early modem was capable of sensing the characteristics of a cellular bus, but the hardware of such modems was designed specifically for a particular model of cellular telephone, so that the same modem could not be used with a variety of different telephones.

One early attempt to solve this problem was the development of microprocessor controlled interfaces which connected to a cellular telephone bus and provided an external connector emulating a standard RJ-11 landline telephone jack. Some of these interfaces, such as the interface disclosed in U.S. Pat. No. 4,718,080 to Serrano et al., were capable of connecting to a plurality of cellular telephones and modifying their operation to use each telephone effectively. The "AB-3X" sold by Morrison and Dempsey Communications, could function with different cellular telephones if different connecting cables and internal firmware chips were installed in the device. Other cellular interfaces emulating a landline telephone jack are shown in U.S. Pat. Nos. 4,012,596, 4,658,096, 4,775,997 and 4,922,517 to West, Jr. et al. and U.S. Pat. No. 4,737,975 to Shafer.

While effective for their stated purpose, these landline emulator interfaces have a number of significant disadvantages which render them ineffective in certain desirable applications. First, these interfaces reduce connected computing devices to the "least common denominator" control functionality of an old-style mechanical telephone. Thus, although a computer and modem connected to such an interface are capable of sophisticated control functions, and the microprocessor-controlled cellular telephone is capable of performing a variety of functions and providing digital status information, a two-wire standard analog telephone interface provided between these two microprocessor systems does not permit sophisticated interaction between the connected systems. In addition, these landline jack emulation interfaces inherently include costly and power-hungry circuitry such as dial tone generators. Finally, connecting a modem to a cellular telephone using such a system does not facilitate a high level of integration and portability which is needed to make portable data transmission practical for a variety of users. Specifically, the systems involve additional cables, circuit boards, housings, and external power supplies which must be transported by the user.

U.S. Pat. No. 4,837,812 to Takahashi et al. shows a facsimile machine which works with both a wireline telephone and a radiotelephone. A variable resistor is adjusted to provide the correct output level for the radiotelephone. The Takahashi machine is automatically switched from wireline to radio transmission modes depending on the hook status of the connected telephone sets. Takahashi does not include any enabling disclosure of radiotelephone dialing controlled by the fax machine.

U.S. Pat. No. 4,868,863 to Hartley et al. shows an interface for connecting a modem to a variety of country-specific landline telephone systems and suggests that a modem might be configured to provide either digital or analog output, but does not provide a system for connecting a modem to control a radiotelephone.

With the development of additional types of alternative telephone systems, such as airplane seat telephone systems, digital cellular telephone systems, low power personal telephone systems, and others, the deficiencies of prior art interface schemes have become even more apparent, since the number of interfaces that must be purchased and transported by a person wishing to transmit data using these systems can become quite large.

U.S. Pat. application Ser. No. 07,531.762 for "System and Method for Interfacing Computers to Diverse Telephone Networks", assigned to the assignee of the present application, discloses a novel interface scheme in which a standardized modem transmits analog data signals and generic digital command signals through a single jack. When connected to a landline telephone jack, the jack produces standard landline DTMF signals and transmits tip and ring data signals. An external interface cable specifically designed to be compatible with one or more alternative telephone system telephones can also be connected between the modem jack and such telephones. When so connected, the modem uses its generic digital command language to control the telephone, and these generic commands are translated into control signals appropriate for the particular telephone bus by circuitry located in the interface cable.

This interface scheme represents a significant advance over prior art interface schemes, because one relatively simple modem can be used with virtually any type of telephone system or telephone. The interface cable of this system, which is the part of the interface hardware that is specific to the particular telephone, is lightweight, inexpensive to manufacture compared to prior art interfaces, and can be powered by either a portable computer battery or portable telephone battery without adversely effecting battery operating time. However, if a modem of this type is to be used with a large number of different alternative telephone systems such as the aforementioned systems currently under development, the use of a cable incorporating conversion circuitry and processing capacity becomes less desirable, because of the expense involved in constructing the cables. Therefore, there is a need for an interface system and method for connecting a standardized modem to a variety of different telephone systems without intermediate signal processing hardware.

SUMMARY OF THE INVENTION

Therefore, it is a general object of the present invention to provide a system including a general purpose modem capable of functioning with a variety of differing telephone systems.

A further general object of the present invention is to provide a method for operably connecting a modem to a variety of differing telephone systems.

Another object of the present invention is to provide a modem having a single connector jack for connection to a variety of telephone systems.

Yet another object of the present invention is to provide a computer modem which can connect to a variety of telephone systems by means of programmable digital input/output lines which operate differently depending on the requirements of the particular telephone device connected to the modem.

Another object of the present invention is to provide a system for transmitting data suitable for use with a plurality of differing telephone system access devices, in which a computer is provided with software and a modem with a plurality of general purpose connection lines, such that a user can select the type of telephone access device using the software, whereupon the modem is controlled so that its general purpose connection lines take on the specific operating interface characteristics required by the connected telephone access device.

It is also an object of the present invention to provide a computer modem having an output jack which incorporates tip and ring lines and also digital data lines, so that by connection of an appropriate cable the modem can be used with a landline telephone system or with an alternative telephone system.

A further object of the invention is to provide a computer modem with a memory for storing a plurality of telephone system software drivers, which may be selectively activated to use the modem with a plurality of types of telephone systems.

Another object of the present invention is to provide a system including a computer with communications software and a modem with a reprogrammable memory device and a universal programmable telephone system connection jack.

Still another object of the present invention is to provide a system including a computer with communications software and a modem with a reprogrammable memory device and a universal programmable telephone system connection jack, wherein the communications software operates to selectively download into modem memory software drivers for the desired telephone system or systems, and wherein the modem can be selectively operated using one of such software drivers to control call placement functions of a variety of telephone systems.

A further object of the present invention is to provide a method of connecting a standardized modem to a plurality of types of telephone systems in which the modem has a plurality of multipurpose programmable digital control lines for controlling a connected telephone terminal, and the functions of the control lines are selected by modem control software according to the operating characteristics of the terminal.

These objects and others are achieved in the present invention by providing a system comprising a portable computer with a central processing unit and associated software. The computer further incorporates a modem with an output jack carrying data transmit (TX), data receive (RX), tip, ring, and programmable digital input/output (DIO) lines. A sufficient number of programmable digital input/output lines are provided to facilitate control of a large number of alternative telephone access devices. The operation and functions of the tip, ring, TX, RX and programmable DIO lines are controlled by software in the modem under the control of the software in the computer. The functionality of each line at any time depends on the type of telephone device connected to the modem. In a preferred embodiment, a user operates the software in the computer to specify a type or model of telephone access device being used with the modem, whereby the RX, TX, tip and ring lines are rendered either operable or inoperable, and a required subset of the programmable DIO lines are caused to operate in a manner necessary to achieve interactive control of an attached telephone access device.

BRIEF DESCRIPTION OF THE DRAWINGS

FIG. 1a is a block diagram showing the system of the present invention connected for use with a radiotelephone, while

DETAILED DESCRIPTION OF THE PREFERRED EMBODIMENT

Figure 1A:
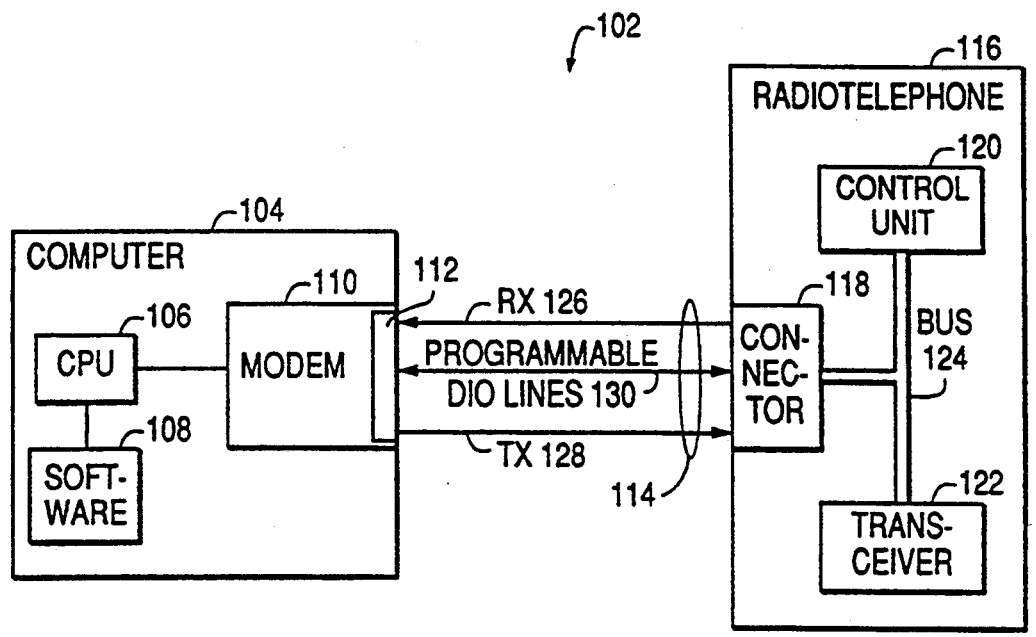
Figure 1B:
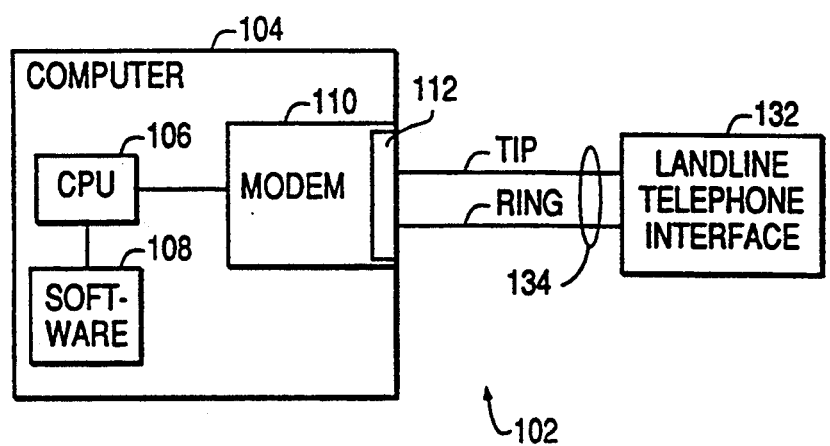
FIG. 1b is a block diagram showing the same system connected for use with a landline telephone system.

Referring first to FIGS. 1a and 1b, a portable data communications system according to the present invention is shown generally at 102. Portable data communication system 102 is configured for use with a radiotelephone in the embodiment of FIG. 1a, while portable data communication system 102 is configured for use with a landline telephone system in the embodiment of FIG. 1b. In both embodiments, system 102 comprises a computer 104 which incorporates CPU 106, software 108, and modem 110.

Computer 104 may be any type of computer. In a preferred embodiment, computer 104 may be an IBM-Compatible portable computer running under the Microsoft MS-DOS operating system, and CPU 106 may typically be one of a number of microprocessors manufactured by Intel in the 80×86 series. CPU 106 is connected to access software 108, which is contained in a memory device such as a random access, read-only or reprogrammable permanent memory, or on a mass storage device such as a magnetic disk drive, optical disk drive, or bubble memory. Of course, those skilled in the art will recognize the computer 104 also has a large number of other operating components connected to CPU 106. For example, various memory and mass storage devices, input and output ports, auxiliary processors, and necessary supporting components may be provided. Computer 104 also preferably has means facilitating user interaction with and control of computer 104, such as an information display screen, and a keyboard or touch screen. As this other associated hardware is generally conventional, it is omitted from drawing FIGS. 1a and 1b for clarity and will not be described in greater detail.

CPU 106 is connected to a novel modem 110 which has a port 112 for connecting the modem to a telephone network access device. Preferably modem 110 is integrated into a main circuit board of the computer 104 or is constructed on a separate circuit board and installed in a card slot provided for that purpose in computer 104. However, modem 110 could also be constructed for external connection to computer 104. Modem port 112 preferably takes the form of a standard RJ-45 telephone connector having 8 pins.

In the embodiment of FIG. 1a, port 112 is connected by a cable 114 to a connector 118 of an access device 116 which is a terminal device for connection to an alternative telephone system. The term "alternative telephone system" will be used herein to define communications systems, other than traditional analog landline telephone systems, which permit transmission of information between a first station and any of a large number of other stations which can be selected by the first station through a "dialing" or equivalent station designating operation. The invention will be described herein using the example of a cellular radiotelephone system, and terminal 116 will thus be referred to as "radiotelephone" 116. However, it should be recognized that the invention is not so limited and could be used with any alternative telephone system now existing or developed in the future including cellular telephones, low power personal telephones, satellite-based telephones, airplane seat phones, and other types.

Radiotelephone 116 is conventional and includes a control unit 120, a transceiver 122 and a connecting bus 124 between control unit 120 and transceiver 122. Connector 118 permits external connection to one or more lines of bus 124. Radiotelephone 116 may be an integrated hand-held unit, or control unit 120 and transceiver 122 may be contained in separate housings and bus 124 may include a connecting cable for connecting control unit 120 and transceiver 122. If radiotelephone 116 is an integrated hand-held radiotelephone, connector 118 will generally be a proprietary connector located in the housing of radiotelephone 116 which provides external access to selected data and control lines of bus 124. If radiotelephone 116 is constructed with multiple separate housings, connector 118 may be implemented as a tap inserted in the connection between control unit 120 and transceiver 122.

Connecting cable 114 is provided on one end with an RJ-45 connector for connecting to modem port 112, and on the other end with a connector compatible with connector 118. Connecting cable 114 carries a receive data line (RX) 126, a transmit data line (TX) 128, and one or more programmable digital input/output (DIO) lines 130.

It should be noted that while the preferred embodiment of the connection between radiotelephone 116 and modem 110 has been described, other embodiments are possible. For example, parallel digital transmission lines could be provided for RX and/or TX functions. Also, a wireless interface such as a radio or infrared transmitter and receiver could be substituted for the hardwired connection shown in the preferred embodiment.

The inventor has determined that most telephone network access devices for alternative telephone systems, such as radiotelephone 116, can be controlled using only a few variable function programmable digital input/output lines 130. In particular, it has been found that a large number of alternative-type telephones can be effectively controlled and made to operate for data transmission and reception purposes using RX line 126, TX line 128, and up to three programmable DIO lines 130. However, a larger number of DIO lines 130 could also be providing by using a second connector in addition to the RJ-45 connector, or a single connector with a larger number of pins. In one secondary embodiment, the lines carried by modem port 112 are divided and carried by a plurality of connectors. For example, tip and ring lines carried by modem port 112 could be carried in a standard RJ-11 jack and RX line 126, TX line 128, and programmable DIO lines 130 could be carried in a separate connector, such as an RJ-45 connector.

Modem 110 can be configured to provide a variety of input and output signals on DIO lines 130, depending on the type of alternative telephone 116 being used. Then, by providing an appropriate cable 114 for connecting modem 110 and alternative telephone 116, a user can transfer data using computer 104 in conjunction with an alternative telephone network. Specifically, in a preferred embodiment, a user can operate computer 104 using special software 108 to select the type of telephone 116 that will be used. Appropriate portions of software 108 may then be loaded into modem 110 and selected for use. In this way, the lines carried by cable 114 effectively control the operation of telephone 116 in placing calls and transmitting and receiving data. Modem 110 can thus be used with any type of alternative telephone system, including cellular telephones, low power personal telephones, airplane seat phones, satellite telephones, and other types of telephone systems now available or which may be developed in the future. Modem 110 will preferably operate using a variety of protocols depending on the characteristics of the telephone system being used to transmit data. When used with a cellular telephone system, modem 110 will preferably operate with the protocols disclosed in U.S. Pat. No. 4,697,281 owned by the assignee of the present invention, the disclosure of which is incorporated herein by reference.

As shown in FIG. 1b, computer 104 incorporating modem 110 can also be connected to a landline telephone interface 132 which is a telephone network access device for landline telephone systems. As indicated previously, modem port 112 is preferably provided in the form of an RJ-45 connector. Landline telephone interface 132 may take the form of an RJ-11 wall plug providing tip and ring connections to a local telephone central office. Cable 134 is connected between the RJ-45 connector of modem port 112 and the landline interface 132 to connect the tip and ring lines of modem port 112 to the tip and ring lines respectively of landline telephone interface 132. Preferably, pins 4 and 5 of the RJ-45 connector of modem port 112 are assigned to the tip and ring lines, so that cable 134 may be a standard landline telephone cable having RJ-11 connectors at each end. Thus, modem 110 provides compatibility with a wide variety of alternative telephone systems, while maintaining backward compatibility with the analog tip and ring landline telephone system. The operation and programming of modem 110 may further incorporate the teachings of allowed U.S. patent application Ser. No. 07/531,762, filed Jun. 1, 1990 entitled "System and Method for Interfacing Computers to Diverse Telephone Networks", the disclosure of which is incorporated herein by reference. When computer 104 and modem 110 are connected to a landline telephone interface 132 as shown in FIG. 1b, modem 110 will generate standard dual tone multi-frequency (DTMF) telephone control signals on the tip and ring lines to place calls, and will then transfer data over the tip and ring lines. When connected to an alternative telephone system, such as radiotelephone 116 as shown in FIG. 1a, modem 110 will generate digital control signals to control call placement. The control signals generated will be transmitted over programmable DIO lines 130 and/or the RX line 126 and TX line 128 and will be specific to the type of alternative telephone being used as selected by the software.

Software 108 is a dedicated communications program which initiates and controls the operation of modem 110. A primary function of software 108 is the selection and loading into modem 110 of drivers for particular telephone devices to be used with system 102. The term "driver" will be used herein to define any combination of program instructions and/or data which is specific to a particular brand, model, or type of telephone network access device. In one embodiment, a separate dedicated software driver program is provided for each telephone device which will be used with the system.

In another embodiment, a specific driver program is provided for landline telephone systems and a generalized driver program is also provided for accessing alternative-type telephone systems. The generalized driver program operates using a data table which has driver data defining the interface scheme of various alternative-type telephone access devices. The generalized program operates appropriately with a particular alternative-type telephone device by referring to this data table and retrieving the necessary information at each step of the program. A typical list of data elements sufficient for the performance of some of the basic functions of system 102 is provided in Table 1. In many cases, the data table will include bit masks which identify which of the RX, TX, and DIO lines will be used to perform a particular transmission or sensing function. Since there are fewer than eight of these lines in the preferred embodiment, a single byte bit mask will be sufficient to define the function of these lines as to a particular operation. The basic list of data elements provided in Table 1 can be expanded as desired to include any information about the telephone that is needed to perform a desired operation.

TABLE 1

GENERALIZED DATA TABLE ELEMENTS

Data Elements for Model/Type Identification
Mask for interfaced lines which are normally high
Mask for interfaced lines which are normally low
Mask for interfaced lines which normally alternate between high and low levels
Data Elements for Checking Bus Availability
Mask for lines which must be high before taking control of bus TABLE 1-continued

GENERALIZED DATA TABLE ELEMENTS

Mask for lines which must be low before taking control of bus
Data Elements for Taking Control of Bus
Mask for I/O lines to be given a "high" level to take control of bus
Mask for I/O lines to be given a low level to take control of bus
Mask identifying lines used for serial digital transmission
Mask identifying lines used for serial clocking operations
Data to be serially transmitted to take control of bus
Data which should be received from phone
Data identifying protocols, i.e. clock high to low, which operation should be performed first, etc.
Mask for I/O lines to be given a "high" level to disable speaker and microphone
Mask for I/O lines to be given a "low" level to disable speaker and microphone
Data Elements for Performing Dialing and Data Operations
Mask identifying line or lines to be used for transmissin
Data indicating audio level for transmission
Initial data to be transmitted
Data to be transmitted to dial "0"
Data to be transmitted to dial "1"
.
.
.
Data to be transmitted to dial "9"
Data to be transmitted to "send" dialed digits
Data to be transmitted to "end" call
Data on acknowledgement signals to be received, if any
Ending data to be transmitted The driver software for a particular telephone device will generally be downloaded into storage memory of modem 110 (for example, "flash upgradeable memory") before that telephone device is used with modem 110. The choice of design for the driving software is dependent on the number of telephone devices which are to be used with a single modem 110. If a very large number of telephone devices are to be used, the memory required to hold separate driver programs for each telephone will also be large, and it will be desirable to provide a generic operating program which operates using a data table for each telephone device, as shown in Table 1. Preferably, the memory of modem 110 will hold several different drivers at the same time and will permit replacement or upgrading of the drivers as needed.

Figure 2:
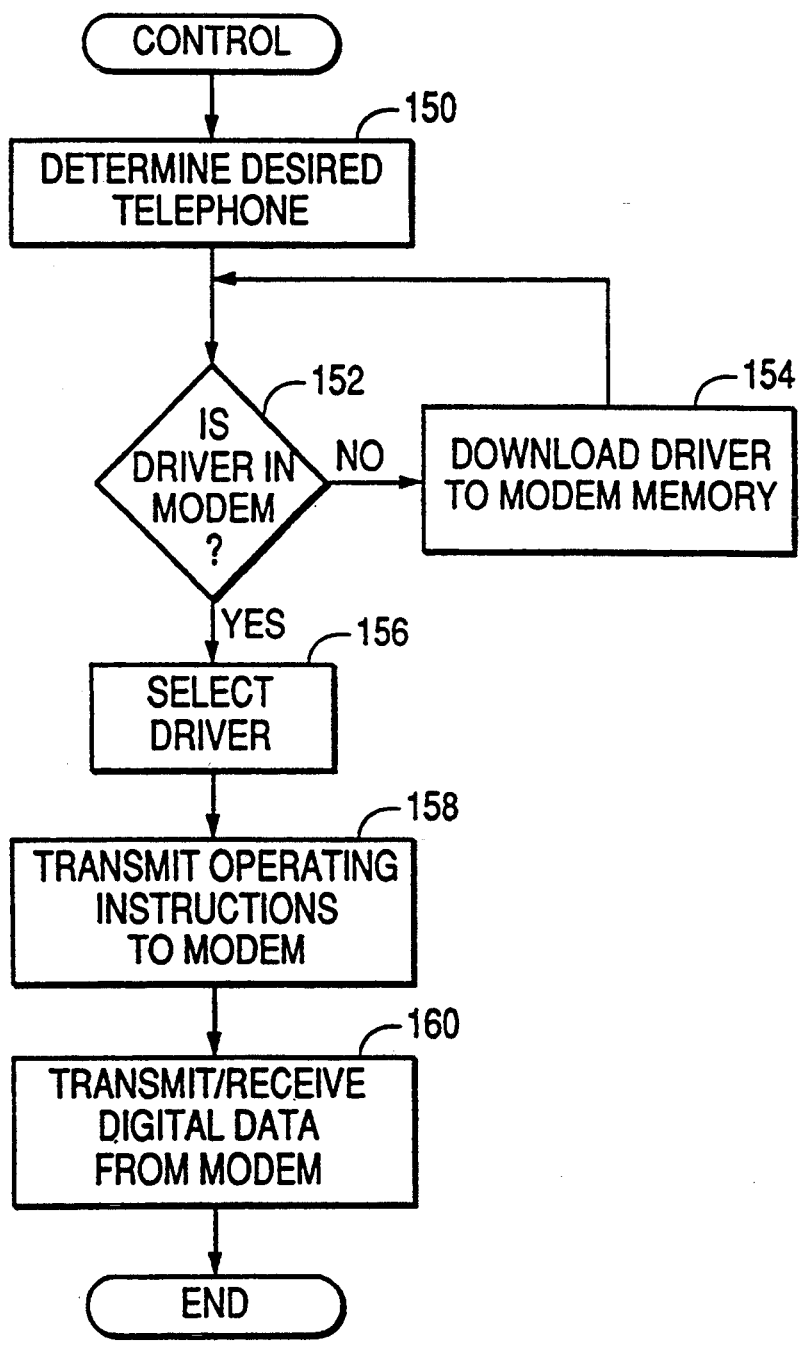
FIG. 2 is a flowchart showing the operation of the computer software used in the system to select the telephone access device to be connected, and thus the system's mode of operation.

A generalized flowchart for software 108 is shown in FIG. 2. Upon transfer of control of CPU 106 to software 108, the program first determines what type and model of telephone is to be used for a communications session as shown in block 150. Preferably, a default selection will be provided for the user based on past usage patterns or based on the connection of a particular cable or the receipt of telephone-bus-specific signals as sensed through modem port 112. If the cable is sensed, a default may be provided in each general class of devices, i.e. one default for tip-and-ring devices and one default for alternative telephone devices. If driver information for particular telephones has been previously downloaded into the memory of modem 110, this information may also be used in determining the default. For example, if modem 110 has driver information stored for landline telephones and for a NEC P300 cellular radiotelephone, then sensing of the connection of a cable to lines of modem port 112 other than the tip and ring lines will cause the NEC P300 driver to be selected as the default.

If actual bus signals are sensed, rather than merely general cable connections, software 108 may be able to identify or at least narrow down the particular model of telephone device being used based on rest-state signal levels transmitted by the bus 124 of the alternative-type telephone. That is, certain lines may be driven "high" or "low" by the telephone. A bit mask defined for each alternative-type telephone could be compared with the bit pattern sensed on the RX, TX, and DIO lines to narrow down or positively determine the type of telephone connected.

It is possible to provide software 108 with drivers for all commercially available alternative-type telephones. However, maintaining and distributing up-to-date driver sets would be cumbersome, and might not provide substantial benefits since any given user will typically access only a few alternative-type telephones. Therefore, in the usual case, driver software for the landline telephone system will be built into software 108, and driver software specific to particular alternative-type telephones may be provided in a separately purchased package along with an appropriate cable 114. Thus, only a few (perhaps one to ten) drivers for the telephone devices normally used by the user will be available in the system, and it may be possible to exclude all but one possible identity of the telephone device connected by fairly rudimentary sensing of the telephone device bus lines.

Preferably, the user may view a menu of telephone devices for which drivers are available in the system 102 and select a device to be used or designate new default telephone devices.

When the default telephone device has been accepted by the user or a different driver has been manually chosen, software 108 determines whether the required driver exists in modem memory as shown at block 152. If the selected driver is not available to the modem, software 108 will preferably download the driver to the modem memory as shown in block 154. Preferably, the driver software will be stored in non-volatile memory so that downloading is only required during the first operation after the user has obtained access to a new telephone network access device, and is not necessary each time modem 110 operates. However, if desired, software 108 could instead operate to download the required driver to volatile RAM in modem 110 each time software 108 is activated.

After software 108 ensures that the necessary driver is available, the driver is designated as the operative driver in block 156, for example by defining pointers to the memory locations of the desired driver instructions and/or data. Modem 110 is thus set to operate with the selected driver.

Next, in block 158, software 108 transmits to modem 110 instructions defining the desired operation. For example, if a data transfer call is to be placed to the number 555-1234, an instruction (preferably part of a predefined or standardized modem instruction set) to this effect would be transmitted by computer 104 to modem 110.

Then, in block 160, software 108 operates to transfer digital data in either or both directions between the computer 104 and a remote modem device through the connected telephone system. This transfer of information may be accomplished by a number of methods well known in the art, which may incorporate "script" processing functions, file transfer functions, or the computer 104 may be placed in a terminal emulation mode for interactive communication with the remote device.

Of course, those skilled in the art will recognize that the system of the present invention could be made to perform the same operations with processing, memory, and software configurations other than the preferred configurations described herein. For example, modem 110 could be controlled from, and the driver software could be resident in, computer 104 rather than being downloaded to modem 110. This mode of operation would be preferred if the modem 110 is integrated onto the main board of computer 104.

Figure 3:
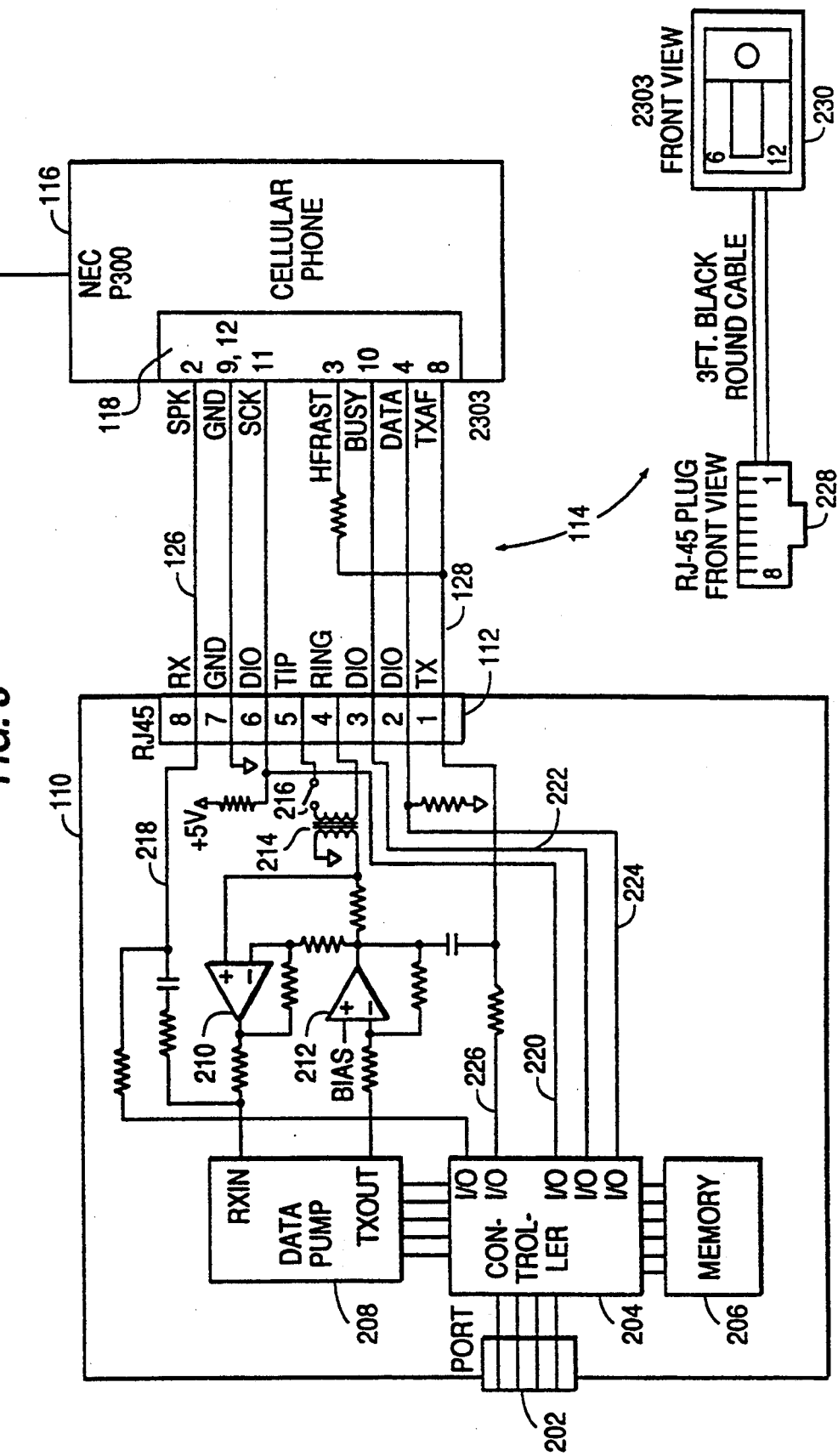
FIG. 3 is a schematic diagram of the modem of the present invention with a cable providing operative connection to a first type of radio telephone.

FIG. 3 is a block schematic diagram of modem 110 and cable 114 of FIG. 1a, configured for use with an NEC Model P300 Cellular telephone 116. Modem 110 comprises a computer connection port 202, controller 204, memory 206, data pump 208, operational amplifiers 210 and 212, isolation transformer 214, hook switch 216 and various associated resistors and capacitors for performing biasing, loading, isolating, and level matching functions in the circuit. Controller 204, memory 206, and data pump 208 are conventional. For example, controller 204 may be a Rockwell C19, memory 206 may be a Toshiba TC55257, and data pump 208 may be a Rockwell R6634.

Modem port 112 has eight lines terminating in an externally accessible RJ-45 connector. Pin 8 of this connector is connected to RX line 218, which is operatively connected to an RX-In terminal of data pump 208 and also to a first I/O port of controller 204. Pin 7 is connected to ground. Pin 6 is biased to +5 volts DC by a connection to a power source through a resistor and is operatively connected by DIO line 220 to a second I/O port of controller 204. Pin 5 of the RJ-45 connector is connected through hook switch 216 and the primary winding of isolation transformer 214 to pin 4 of the RJ-45 connector. The secondary winding of isolation transformer 214 is connected through operational amplifiers 210 and 212 to the RX-In and TX-Out pins of data pump 208. Pin 3 of the RJ-45 connector is connected by DIO line 222 to a third I/O port of controller 204. Pin 2 of the RJ-45 connector is biased to 0 volts by a pull-down resistor connected to ground, and is further connected by DIO line 224 to a fourth I/O port of controller 204. Pin 1 of the RJ-45 connector is connected by TX connecting line 226 to the TX-Out terminal of data pump 208 and to a fifth I/O port of controller 204. Additional conventional tip and ring interface circuitry not shown in the diagram but well known in the art may also be provided, such as a ring voltage detector circuit.

The RX-In and TX-Out pins of data pump 208 are thus connected through appropriate interface circuitry to the tip and ring lines (pins 4 and 5 of the RJ-45 connector) to facilitate transfer of data using a conventional tip and ring interface. The RX-In and RX-Out pins are also operatively connected to RX and TX lines of the RJ-45 connector, respectively. Thus, a two-wire to four-wire conversion means is provided for operatively connecting the two wire analog data interface of data pump 208 simultaneously to a tip and ring interface and also to an RX-TX interface.

Hook switch 216 is provided for selectively connecting the tip and ring lines to create an on-hook or off-hook condition, and operates under control of the controller 204 by a connection which is omitted from the drawing for clarity. Although not shown in the drawing, isolation switches can also be provided for the RX and TX pins of the RJ-45 connector, operating under control of controller 204, to prevent transfer of signals through the RX and TX lines when the tip and ring interface is in use, and vice versa. Thus, controller 204 is provided with a means for selectively activating either a tip-and-ring style interface or an RX-TX style interface depending on the requirements of the attached telephone device. However, in the preferred embodiment, both the RX/TX and tip-and-ring interfaces are activated and operable whenever modem 110 is activated, and the interface that is used for carrying data is determined by the connections made by cable 114 or cable 134. Preferably, the cables used with the system will operably connect either the RX/TX lines or the tip-and-ring lines to a telephone device, but not both.

The data pump 208, through its connection to the tip-and-ring or RX-TX lines, provides analog data transfer capability. Significantly, in addition to selecting the interface standard, controller 204 can selectively operate the modem 110 in either an analog or digital data transfer mode. This capability is facilitated by the connection of the RX pin 8 and TX pin 1 of the RJ-45 connector to the first and fifth I/O ports of controller 204. Controller 204 may selectively deactivate data pump 208 and activate its first and fifth I/O ports to transfer data in serial digital form over the RX and TX lines of modem port 112. As a result, modem 110 of the present invention can be used with telephone systems which use analog data transmission, such as public cellular radiotelephones, and also with systems using digital transmission, such as certain digital cellular telephones currently under development which incorporate their own modulation and demodulation devices for transmitting digitized voice signals.

The connection of I/O ports to the RX and TX lines also permits sensing the presence of signals on these lines, particularly when the modem 110 is not transferring data. For example, a ringing signal may be generated on the speaker line of radiotelephone 116 which is connected to the RX line, and this signal could be sensed by controller 204 to initiate a call answering sequence of modem 110. This I/O port connection also facilitates biasing of the RX and TX lines which, as will be seen, is desirable for controlling alternative telephone operation.

Computer connection port 202 provides an operative connection to facilitate interactive control and transfer of data between modem 110 and computer 104 (shown in FIGS. 1a and 1b). Port 202 may be a serial port, a parallel port, a bus connection, or have any other appropriate configuration depending on the interface provided in the design of computer 104 for the connection of modem 110. Port 202 is operatively connected to controller 204, which is operatively connected by a plurality of lines to both data pump 208 and memory 206. Memory 206 provides read/write storage of data during modem operation, and also provides permanent or semi-permanent storage for operating software of modem 110. Preferably, memory 206 may incorporate "flash upgradeable memory" which can be loaded or reloaded with a particular desired set of instructions which are then retained in memory 206 until replaced in a subsequent programing operation.

In this first example, the modem 110 is configured for use with an NEC Model P300 cellular telephone. Those skilled in the art will recognize that based on the disclosure herein, similar configurations could be provided for a variety of cellular and other alternative telephones.

Cable 114, as shown in the inset of FIG. 3, is provided with an RJ-45 plug 228 at one end and a type 2303 connector 230 at its other end. The RJ-45 connector 228 mates with the RJ-45 jack of modem port 112, and the type 2303 connector 230 connects to a mating connector 118 on the NEC P300 cellular telephone 116. The pin connections of cable 114 are shown in FIG. 3, and also in Table 2.

TABLE 2

| CABLE CONNECTIONS FOR NEC P300 | | | |
|---|---|---|---|
| RJ-45 | | 2303 | |
| PIN | NAME | PIN | NAME |
| 1 | TX | 8, 3 | TXAF |
| 2 | DIO | 4 | DATA |
| 3 | DIO | 10 | BUSY |
| 4 | RING | | |
| 5 | TIP | | |
| 6 | DIO | 11 | SCK |
| 7 | GROUND | 9, 12 | GROUND |
| 8 | RX | 2 | SPK |

Through the design of cable 114, DIO lines 130 are connected to the particular lines of cellular bus 124 of radiotelephone 116 which must be actuated to control the placement and reception of calls using radiotelephone 116. As shown in the diagram, for certain telephones such as the NEC P300, the number of lines of cellular bus 124 to be actuated may be greater than the number of programmable DIO lines 130 provided by modem port 112. In such cases, as in the example shown here, TX line 128 and RX line 126 may be connected to more than one line of bus 124, such as through biasing resistors. Preferably, the lines of bus 124 which share a single line from modem port 112 are grouped so that the signals they require need not be provided at the same time as signals to other lines of bus 124 connected to the same line of modem port 112. Alternatively, if such a grouping is not possible, TX line 128, in particular, can be used to bias a line of cellular bus 124 which is to be held at a high level during data transmission. TX line 128 can then be held high during periods when no data is transmitted. In many cases the brief drops of TX 128 to a low level during data transmission may not adversely effect the operation of cellular bus 124 since internal capacitance may prevent the additionally connected biased line of cellular bus 124 from becoming unbiased by the toggling of TX line 128.

The function of the various lines of the NEC P300 cellular telephone's connector 118 will be described only in general terms herein sufficient to promote an understanding of the present invention. Those skilled in the art will recognize that the construction and programming of the system of the present invention to work with any specific alternative-type telephone must be performed with reference to the bus interface specification of the particular alternative telephone which is to be used, as defined by the manufacturer of that telephone. For example, for the NEC P300 cellular telephone, the "TR5E-800-21A data/audio interface specification" produced by NEC America provides specifications for the precise signal sequences to be transmitted to externally control the NEC P300 telephone, and is incorporated herein by reference. The signals and sequences required vary depending on the manufacturer and model of telephone to be used, and are not part of the present invention.

In the example of FIG. 3, RX pin 8 is connected to SPK pin 2 which is an audio output or "external speaker" line of bus 124. DIO pin 6 is connected to SCK pin 11, which is a serial clock line which is biased from high to low by either the telephone or an external device to indicate the presence of valid data on DATA pin 4. HFRAST pin 3 can be biased to +5 volts DC to disable the microphone and speaker of telephone 116. The level of BUSY pin 10 can be raised and lowered to indicate the present availability of bus 124. DATA pin 4 is a bi-directional serial digital data line capable of transmitting and receiving signals to indicate the status of radiotelephone 116 and to initiate operations such as call placement operations under external control. TXAF pin 8 is an audio signal input line which accepts an analog microphone signal.

Figure 4:
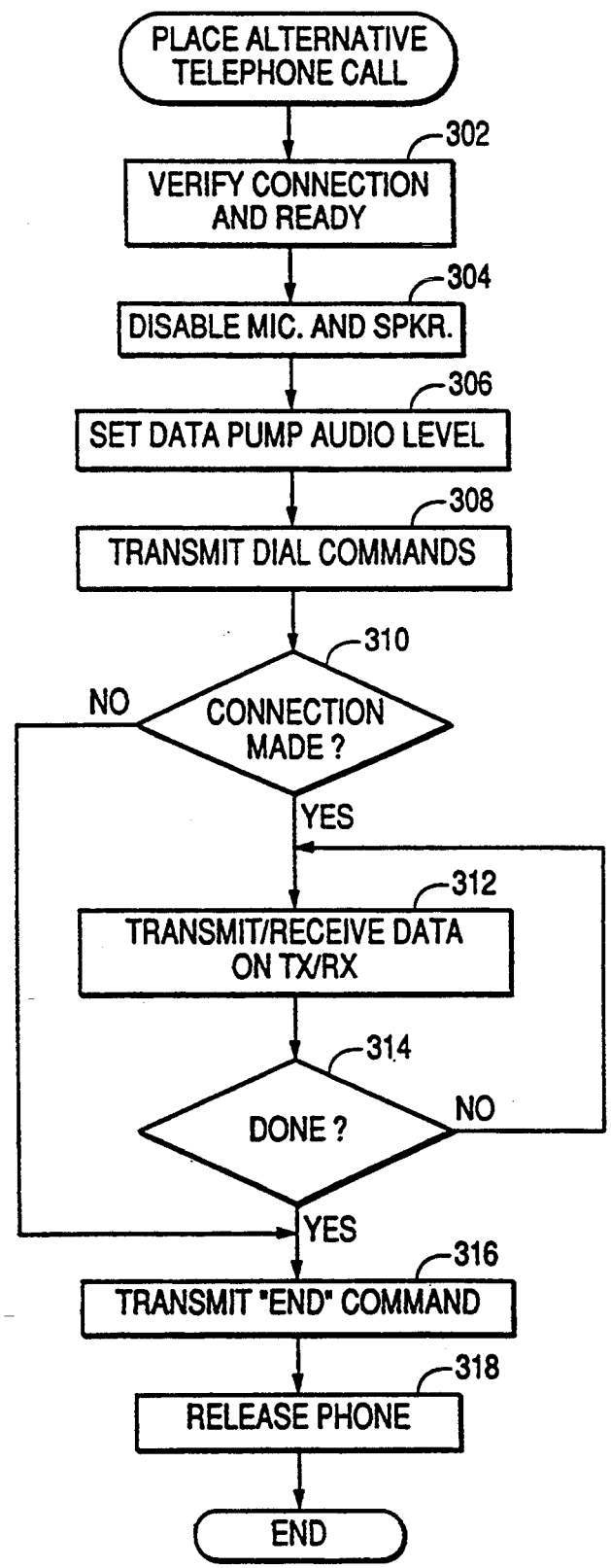
FIG. 4 is a flowchart showing the steps performed by software in the modem or the computer to control the operation of the lines for the connection shown in FIG. 3.

The operation of modem 110 to initiate a call and the transmission and reception of data using the NEC P300 cellular telephone will now be described with reference to the flowchart of FIG. 4. The flowchart of FIG. 4 shows the steps performed by a software routine stored in memory 206 and performed by controller 204 in response to a program initiation signal received through port 202 from computer 104. The software routine used may be provided specifically for the NEC P300, or a generalized program may be provided, along with a data table which defines the interfacing scheme of the NEC P300 so that the generalized software program can operate with the NEC P300 as described herein.

FIG. 4 shows the steps performed by the software of modem 110 to place a call and transfer data using an alternative telephone network access device. These steps will be described with particular reference to the example of FIG. 3 which uses an NEC P300 cellular telephone 116 as the alternative telephone network access device. In the first step, shown as block 302, the modem verifies that radiotelephone 116 is connected and ready to operate. One or more of the lines of modem port 112 (shown in FIG. 3) may be sensed by controller 204 to determine whether cable 114 has been properly installed to connect modem 110 to radiotelephone 116. Modem 110 can determine whether radiotelephone 116 is ready to receive control instructions by sensing the status of the BUSY line of radiotelephone 116. A low signal level on the BUSY line indicates that radiotelephone 116 is not available to receive commands.

When modem 110 has determined that radiotelephone 116 is connected and ready to operate in placing a call to transfer data, modem 110 will disable the microphone and speaker of radiotelephone 116 as shown in block 304 of the flowchart of FIG. 4. The microphone of radiotelephone 116 is disabled to prevent ambient noise from interfering with the transmission of data. The speaker of radiotelephone 116 is disabled so that the user is not forced to listen to a data carrier and/or modulated data signal over the speaker of radiotelephone 116. In the example shown using the NEC P300, the disabling of the microphone and speaker of radiotelephone 116 is accomplished by biasing RX line 126 to +5 volts DC using the connected first I/O port of controller 204, and biasing the TX line 128 to +5 volts DC by placing a "high" level signal on the second I/O port of controller 204. Biasing the RX and TX lines to +5 volts DC places a high level signal on the SPK, HFRAST, and TXAF lines of the NEC P300 which has the effect of disabling the microphone and earpiece and activating the transfer of audio signals to connector 118.

As shown in block 306, the software of modem 110 then sets the audio output level of data pump 208 to the proper level for analog reception and transmission of data over the RX line 126 and TX line 128 respectively. For the NEC P300 cellular radiotelephone, an audio level of −28 dB is preferred. However, for other cellular radiotelephones or other type alternative telephones, different audio levels will customarily be required. Because data pump 208 is capable of adjusting its audio level in response to software-driven commands of controller 204, it is possible to use modem 110 with a wide variety of alternative telephones. If the alternative telephone is one which includes its own modulating and demodulating device similar to data pump 208, modem 110 may transmit and receive digital signals over the RX and TX lines using the I/O ports of controller 204 as described previously. If operation in this mode is desired, the audio level of data pump 208 will be set to 0, i.e. the data pump 208 will be disabled. If the audio level required by the connected telephone is lower than the range of the data pump 208 used in the circuit, a resistor can be provided in the RX line 126 in cable 114 to reduce the output voltage.

Having optimized the functions of modem 110 for the particular alternative telephone in use, modem 110 will then transmit command signals to initiate a telephone call, as shown in block 308 of FIG. 4. The commands will be transmitted by assigning particular functions to the DIO lines 130 according to the type of alternative telephone in use. In the case of the NEC P300 cellular radiotelephone 116, the programmable DIO lines 130 are connected to the SCK, BUSY, and DATA lines of bus 124 of radiotelephone 116. It will be recognized that the software-controlled function of the DIO lines 130 will be selected depending on the characteristics of the alternative telephone device being used. In addition to the connections required, the precise signals (and the timing of the signals) which are transmitted to the alternative telephone device to produce the desired operations, will be determined with reference to the interface specification which is defined by the manufacturer of the particular alternative telephone device. In the case of the NEC P300 cellular radiotelephone, dial commands will be transmitted according to the signal definitions provided in the NEC Data/Audio Interface Specification previously referenced. In general, for the NEC P300 cellular radiotelephone 116, modem 110 will provide a dial command by pulling the BUSY line low to gain control of the bus, and then transmitting the command in serial digital fashion to the DATA line, providing a clocking signal for the serial data transmission on the SCK line. Typically, the dial commands may take the form of keypress emulating commands available in the command set of the alternative telephone system. For example, to dial the telephone number 555-1234 using the NEC P300 cellular radiotelephone 116, modem 110 would sequentially transmit keypress emulating commands on the DATA line for each of the 7 digits of the telephone number, beginning with 5 and ending with 4. Modem 110 would then transmit a command on the DATA line to emulate the pressing of the "send" key on radiotelephone 116. As a result, radiotelephone 116 will perform the operations it would have performed if the user had dialed the number on its keypad and pressed the "send" key, resulting in the placement of a call to the specified telephone number.

In the next step of the flowchart of FIG. 4, in block 310, modem 110 determines whether a connection has been made to the selected telephone number. This determination is made by receiving status information from the alternative-type telephone. In the case of NEC P300 cellular radiotelephone 116, call status information will be returned to modem 110 on the DATA line. If the alternative telephone device is not capable of providing detailed status information, modem 110 may operate by assuming that a connection has been made and waiting for a carrier on the RX line 126 transmitted by a corresponding modem at the dialed telephone number. A time-out clock of, for example, 20 seconds could be provided in this case, and if no carrier signal is received from the remote location before the end of the defined period, modem 110 will assume that the connection attempt has failed and operate accordingly. Specifically, in the case of a connection failure, control will transfer to block 316 of FIG. 4 whereupon modem 110 will transmit a command to the alternative telephone directing it to end the call placement attempt. In the case of the NEC P300 cellular radiotelephone 116, a command to emulate the pressing of the "end" key could be transmitted. Then, as shown in block 318, modem 110 will reset its internal operation and release its control over bus 124 of radiotelephone 116. In the case of the NEC P300, modem 110 will allow the busy line to return to a "high" level to relinquish control of the bus. Preferably, modem 110 will generate an indication to the user that the call has been disconnected, or that it could not be placed.

If the connection is made, control transfers to block 312 in which data is transmitted and/or received over the TX line 128 and RX line 126 respectively. Typically, this step will involve transmission and reception of carriers which must be detected by the modems at each end to allow data transmission. Also, modem 110 may negotiate protocols to be used, including error correction protocols and speed of transmission with the remotely connected modem. The protocols preferred by modem 110 in the negotiation will be determined by the type of telephone system being used. For example, in a cellular system, enhanced error correcting protocols will be preferred because fading, interference, and hand-offs in such systems inherently cause an increased rate of errors which must be corrected. When the connection has been fully established in this manner, modem 110 may transmit and/or receive data on TX line 128 and RX line 126.

Transfer of data may be accomplished by a number of general methods which can be selected by the user. For example, the communications software may enter a terminal emulation mode permitting direct interaction of the user with a remote computer. Alternatively, the software may enter a file transfer mode for transferring data to or from memory or a storage medium.

The transfer of data will continue until the transfer is complete as shown in block 314, either by virtue of there being no further data which is to be transferred, or by virtue of some interruption in the telephone which causes a permanent interruption in the data link. Preferably, temporary interruptions such as those occurring during cell hand-offs in a cellular telephone system, will be tolerated as long as such interruptions do not exceed a predetermined time-out determined with reference to the characteristics of the particular alternative telephone system in use.

It is generally preferred to automate the placement of data transfer calls under control of the computer 104 according to the flowchart of FIG. 4. It will also be desirable to similarly automate other line control functions which are known in the modem art. For example, auto-answer capability can be provided in which the modem is placed in a waiting mode to receive data transfer calls. When the modem is in auto answer mode and a ringing signal is received, the same general sequence of steps will be performed as described with reference to FIG. 4, but the commands transmitted to the alternative-type telephone in block 308 will be commands to answer the incoming call, rather than to place a call. Although less preferred, it is also possible to provide only a minimal capability of modem 110 to control a connected alternative-type telephone. For example, in the flowchart of FIG. 4, blocks 308 and 316 could be eliminated, and call placement and termination would then be manually performed by the user using the controls of the alternative-type telephone. Modem 110 would still operate to disable the microphone and speaker and take control of the telephone bus after the call is placed, and would then release the bus and enable the microphone and speaker after completion of the data transfer.

Figure 5:
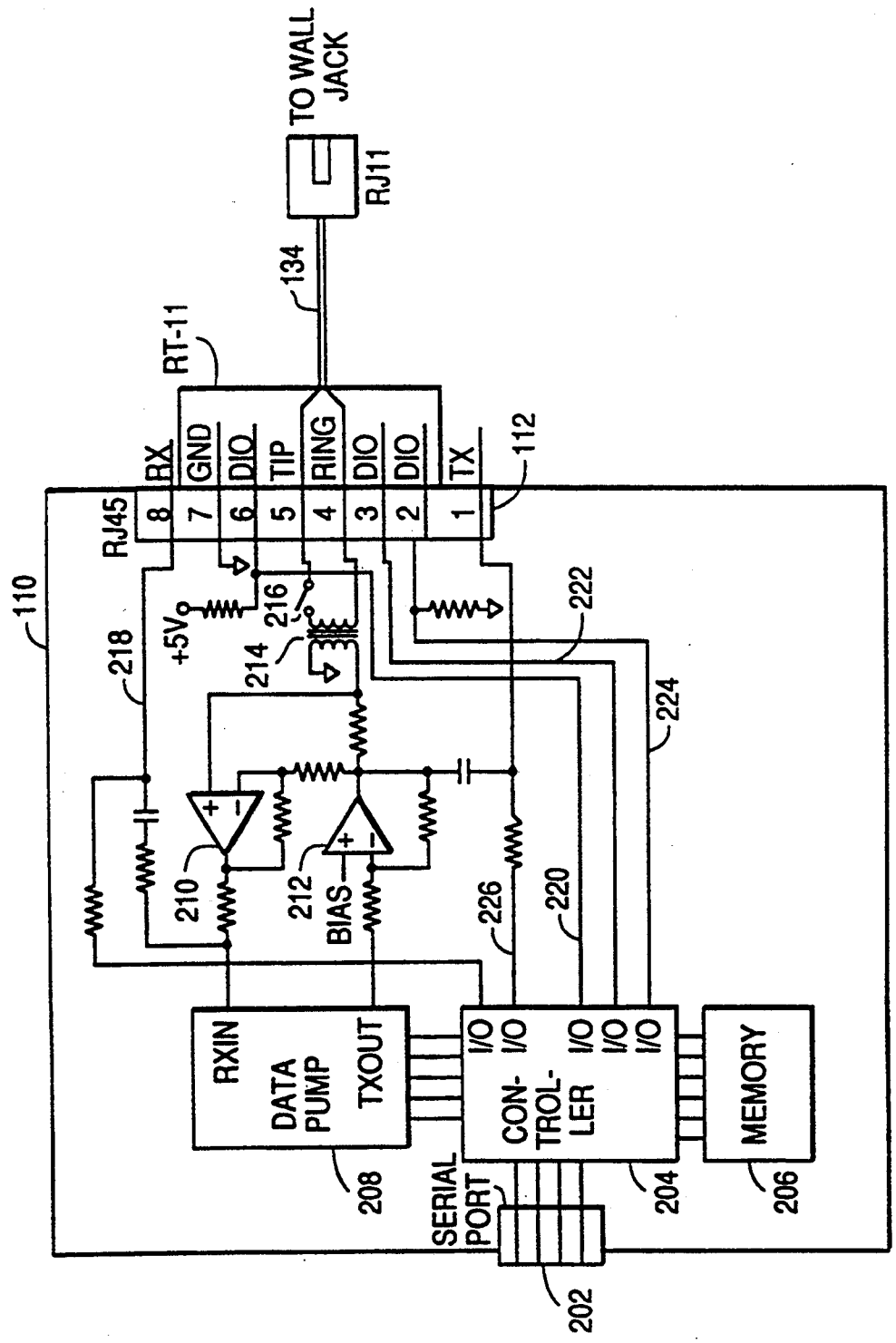
FIG. 5 is a schematic diagram showing the modem of the present invention and a cable for connecting this modem to a standard landline telephone jack for use with the landline telephone system.

In addition to having a plurality of functional modes permitting selective operation with a variety of alternative-type telephone systems, modem 110 can be used with a standard landline telephone system, as will be described with reference to FIG. 5. FIG. 5 shows modem 110 operatively connected to a landline telephone system in the configuration shown previously in FIG. 1b. Pins 1–3 and pins 6–8 of the RJ-45 connector of modem port 112 are not connected in this configuration. The tip and ring lines (pins 4 and 5 respectively) are connected to tip and ring lines of a standard landline telephone wall jack by a cable 134 having RJ-11 connectors at each end. To accommodate such a connection, the RJ-45 connector of modem 110 is preferably of the type which will accommodate insertion of other RJ-45 connectors, and also a centered insertion of an RJ-11 connector having a slightly lesser width and 6 pins rather than 8. Thus, pins 4 and 5 of the RJ-45 connection of modem port 112 will be connected to the third and fourth pins respectively of a 6-pin RJ-11 connector inserted in the RJ-45 jack.

Figure 6:
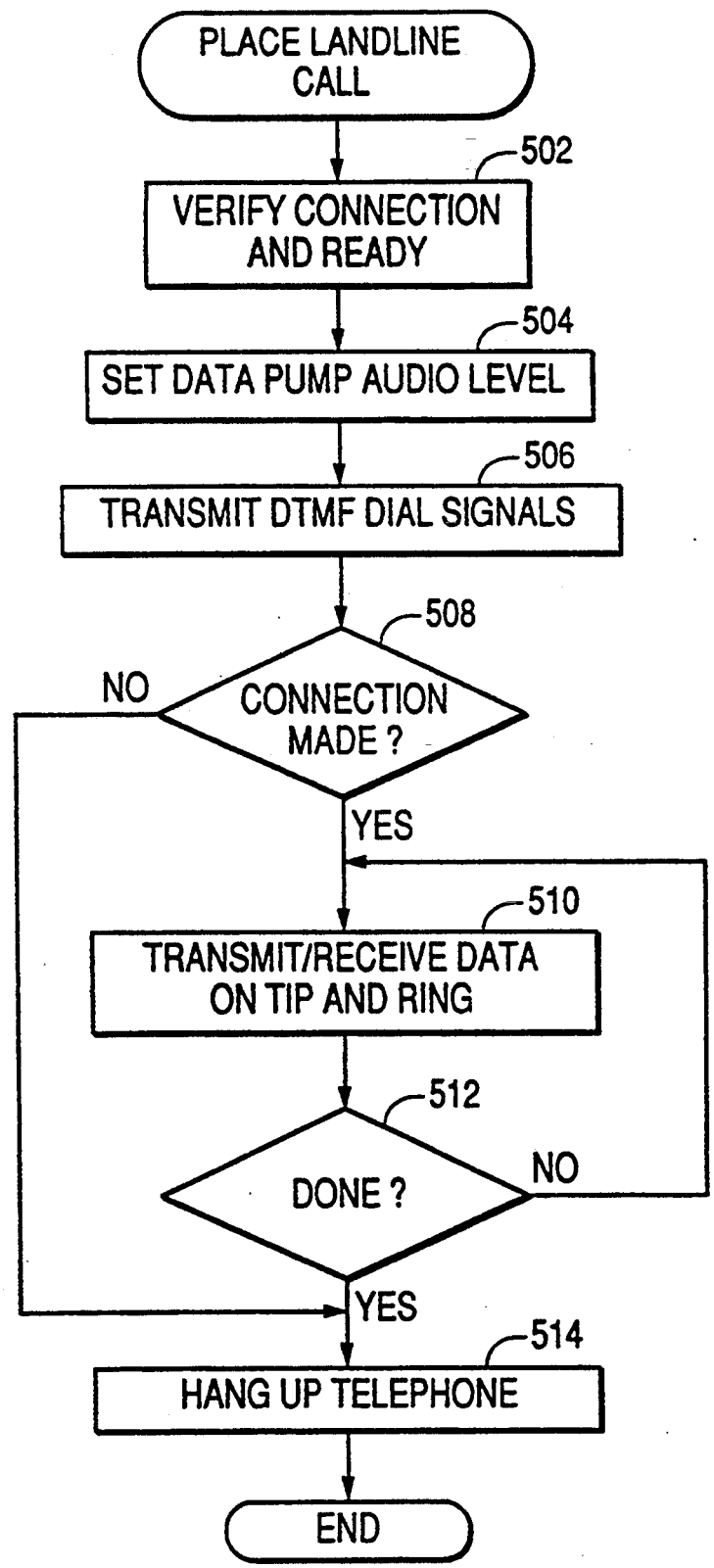
FIG. 6 is a flowchart showing the steps performed by software in the modem or the computer to control the operation of the lines for the connection shown in FIG. 5.

The operating software of controller 204, which as described previously may be stored in memory 206, provides for different operating parameters in the configuration of FIG. 5 than are provided in the configuration of FIG. 3. As noted previously, the software provided may either include a separate program for landline operation, or may be generalized, in which case a data table will be provided with the program specifying which functions are to be performed and which lines are to be used for particular functions, so as to provide the operation described herein with respect to landline telephone systems. FIG. 6 shows a flowchart defining the functions of the software of modem 110 in placing a landline call when modem 110 is connected to a landline telephone system as shown in FIG. 5. In block 502 of the flowchart, the call placement function begins with verification that the landline telephone system is connected and ready for use by the modem in placing a call. Typically, this verification function may be performed by taking the landline telephone line off hook using hook switch 216, and detecting the presence or absence of a dial tone on the tip and ring lines. This operation thus differs from the operation defined in block 302 of FIG. 4 in that no digital data interchange occurs between modem 110 and the connected telephone system.

Next, as shown in block 504, the data pump 208 audio level is set by controller 204 to an optimized level for landline telephone communication. In a preferred embodiment, the audio level for landline communications will be set to a value in the range of −10 to −25 dB.

In block 506, dual-tone multi-frequency telephone dialing signals are generated by conventional circuitry associated with modem 110 and transmitted over the tip and ring lines to the landline telephone system. Dual-tone multi-frequency signal generation may be provided as a capability of data pump 208, or a separate DTMF generating circuit (not shown) may be provided within modem 110 and operatively connected to the tip and ring lines in a manner which is well known in the art. This dialing operation, in contrast to the operation of block 308 in FIG. 4, does not involve the transmission of digital control and handshaking signals through the variable function programmable DIO lines 130, but instead is an analog transmission of standardized DTMF telephone control signals over the tip and ring lines.

In block 508, modem 110 monitors the signals on the tip and ring lines to determine whether a connection has been made to the dialed telephone number. In particular, data pump 208 may be operated to detect a carrier signal transmitted by a distant modem at the dialed telephone number, with the receipt of the carrier signal indicating that a data transfer connection has been completed. When the data transfer connection has been made, digital data to be transferred is transmitted and received over the tip and ring lines and the tip and ring interface circuitry of modem 110 by the data pump 208. Data pump 208 transmits modulated signals representing digital data to be transmitted through the TX-Out pin, and receives modulated signals representing digital data through the RX-In pin. Controller 204 receives data to be transmitted from computer 104 through port 202 and passes the data to data pump 208 for transmission. Controller 204 receives incoming data from data pump 208 in digital form and transmits this data through port 202 to computer 104. Controller 204 determines the error correcting and other protocols which are to be used in the transmission of data depending on the software program. Because of the greater reliability of a hard-wired landline telephone system, simpler error correcting protocols which generate less overhead are preferred for landline communications. As noted before, because systems which incorporate radio transmission of data are subject to interference, fading, transmitter hand-offs, and other sources of data error, more complex error correcting protocols such as forward error correction, variable packet sizing and other techniques may be used with alternative-type telephone systems.

When the desired transfer of data has been completed, as shown at block 512, control passes from block 510 to block 514 and controller 204 operates hook switch 216 to place the tip and ring lines on hook thus disconnecting the call. In cases where the desired call cannot be completed for the transfer of data, control is passed from block 508 to block 514, bypassing the transmission and reception of data, and the call is disconnected. Preferably, in this case, controller 204 provides a signal to computer 104 to alert the user to the nature of the call failure.

Because the DIO lines 130 can be operated variably to interface with various types of telephones 116, a single modem can be used with all existing landline and cellular networks, as well as other types of telephone networks which may come into common use. Thus, this modem eliminates the need for a computer user to have several modems. In addition, the standard, generic nature of the modem means that it can be produced in very large quantities by manufacturers and stocked in small quantities by retailers since there will be no great proliferation of models. The generic nature of the modem and the fact that the modem can be reprogrammed by software 108 introduced into computer 104, to thus work with new and different types of access devices 116 means that modem 110 can be integrated into the main circuit board of computer 104. Such an integrated modem can be upgraded for use with new telephones and telephone-like systems by introducing new operating software, rather than by replacing the modem hardware. Because of its generic nature, the modem according to the present invention can also be mass produced for little more than the cost of a landline-only modem. The modem according to the present invention contains all the complex circuitry necessary to establish communications. Only relatively simple and inexpensive connecting cables need be specific to the telephone which is to be used with the modem. Thus, the system of the present invention further reduces the total end user cost of multi-network data transmission access.

I claim:

1. A system for transferring data between a computing device and a remote device using a selected one of a plurality of telephone network access devices including at least one radiotelephone network access device, comprising:

modem means for connection to said computing device and further connectable by at least one of a receive line and transmit line interface and a tip and ring line interface to one of said telephone network access devices for transferring data between said computing device and a remote data transfer device over said connected telephone network access device, said modem means operating selectively to transfer digital data in one of at least two modes depending on the type of telephone network access device in use: a first mode using said receive line and transmit line interface to transfer a signal representing digital data, and a second mode using said tip and ring interface to transfer an analog signal representing digital data, said modem means comprising:

modem controller means connected to said computer means for controlling the mode of operation of said modem means and for controlling call placement functions of said connected telephone network access devices in response to a software driver; and memory means connected to said modem controller means for storing one or more of said software drivers, each including data specific to at least one particular telephone network access device for use by said modem controller means in selecting an appropriate one of said modes of operation of the modem and generating appropriate call placement control commands specific to said particular telephone network access device; and a data communications program operating in the computing device and capable of accessing a plurality of said software drivers and thereafter selectively downloading one or more of said software drivers to said memory means for subsequent use in transferring data using an associated telephone network access device connected to said modem means.

2. The system of claim 1 wherein said memory means has the capacity to store a plurality of said software drivers.

3. The system of claim 2 wherein said memory means stores a software driver for a landline telephone connection and at least one software driver for a cellular radiotelephone connection.

4. The system of claim 1 wherein said memory means comprises flash reprogrammable memory.

5. The system of claim 1 further comprising jack means for connecting said tip and ring interface and said transmit line and receive line interface to said one of said telephone network access devices.

6. The system of claim 5 wherein said jack means comprises a standard telephone connector, and further comprising cable means extending at least between a first connector mating with said standard telephone connector and a second connector mating with a connection port of said telephone network access device.

7. The system of claim 6 wherein said cable means is a standard RJ-11 landline telephone cable.

8. The system of claim 7 wherein said standard RJ-11 landline telephone cable operably connects said tip-and-ring interface to said telephone network access device without operably connecting said transmit line and receive line interface to said telephone network access device.

9. The system of claim 6 wherein said first connector is an RJ-45 connector.

10. The system of claim 6 wherein one said cable means operably connects one or more of said control lines and said receive line and transmit line interface to a selected radiotelephone network access device without operably connecting said tip and ring interface to said radiotelephone network access device.

11. The system of claim 10 wherein said cable means comprises level setting means for setting the signal level transmitted by said transmit line and receive line interface.

12. The system of claim 11 wherein said level setting means comprises a resistor installed in said cable means.

13. The system of claim 6 wherein a plurality of said cable means are provided, each cable means specifically designed in conjunction with said software drivers to render said system operable with at least one of said telephone network access devices.

14. The system of claim 5 wherein said jack means comprises two connectors, a first connector for connecting to said tip and ring interface and a second connector for connecting to said receive line and transmit line interface.

15. The system of claim 14 wherein said first connector is an RJ-11 connector having six pins and said tip-and-ring interface uses the third and fourth pins of said RJ-11 connector.

16. The system of claim 1 wherein the receive and transmit interface operates at a specified audio level, said audio level variable under the control of said modem controller means according to the requirements of the telephone network access device in use.

17. The system of claim 16 wherein said software drivers include data defining the required audio level for the selected telephone network access device whereby said audio level is appropriately set.

18. The system of claim 1 wherein the modem controller means further comprises digital data ports operably connected to said receive line and said transmit line respectively, whereby said modem controller may selectively control and monitor the signal levels on said receive line and said transmit line.

19. The system of claim 18 wherein said modem controller means selectively operates to transfer data in digital form over said receive line and transmit line interface.

20. The system of claim 1 further comprising bifunctional means for selectively operating said receive line and transmit line interface in a first mode to transfer an analog signal representing modulated digital data and in a second mode to transfer a digital data signal in bipolar form, the selection between said modes determined by the type of telephone network access device in use.

21. The system of claim 1 wherein the modem controller means operates to transfer digital data in one of two modes: a first mode wherein said receive line and transmit line interface transfers a signal representing digital data, and a second mode wherein said tip and ring interface transfers an analog signal representing digital data, the selection of said first or second mode determined by the type of telephone network access device in use.

22. The system of claim 21 wherein said software drivers define the mode of operation to be used with a particular telephone network access device.

23. The system of claim 1 wherein the modem controller means selectively operates the modem means in one of three data transfer modes: a first mode wherein analog signals representing modulated digital data are transferred using said receive line and transmit line interface, a second mode wherein digital data signals in bipolar digital form are transferred using said receive line and transmit line interface, and a third mode in which said analog signals of the first mode representing modulated digital data are transferred using said tip and ring interface, wherein the selection between said modes is programmably determined depending on the type of telephone network access device in use.

24. The system of claim 1 wherein said memory comprises storage and upgrade means whereby said software drivers are retained for use in said modem means until replaced by the operation of said communications software in response to a user instruction.

25. An integrated computer and modem system for processing and transferring data using a selected one of a plurality of telephone network access devices including at least one radiotelephone network access device comprising:

computer means for processing data transferable over the telephone network access device, and having a data communications program;

modem means integrated with the computer means for transferring data between said computer means and a remote data transfer device over said telephone network access devices, said modem means comprising:

data pump means for transferring data between the modem means and the telephone network access device;

a data access arrangement operatively connected to said data pump means for providing a tip-and-ring interface for carrying signals between the modem means and said telephone network access device at least when said telephone network access device operates using a tip and ring interface;

receive and transmit data lines operatively connected to said data pump means to provide a receive line and transmit line interface for carrying data between the modem means and said telephone network access device at least when said telephone network access device operates using a receive line and transmit line interface;

control signal lines for carrying control signals for controlling and/or monitoring the operation of said radiotelephone network access device; and jack means connected to said control signal lines, said data lines, and said data access arrangement for providing a dedicated external connection of said tip and ring interface, said receive line and transmit line interface, and said control signal lines as required to operably connect the modem means to said selected telephone network access device;

wherein the data communications program of said computer comprises software drivers for selectively controlling the operation of said modem means in conjunction with one of said plurality of telephone network access devices, said data communications program operating to vary the operation of said control signal lines in response to said selected software drivers to permit the control of call placement functions of different types of telesphone network access devices by said modem means.

26. A method of connecting a computing device to one of a plurality of types of telephone systems for transfer of data, comprising the steps of:

installing a modem in the computing device, the modem having a plurality of digital telephone control lines with functions that vary under control of different software drivers corresponding to different types of digitally controlled telephone systems, including a jack facilitating connection of the modem to either a landline telephone system or a radiotelephone system, including selective connection of said digital telephone control lines;

providing a telephone terminal for the telephone system to be used;

connecting between the modem jack structure and the telephone terminal a cable establishing sufficient connections of said digital telephone control lines to the telephone terminal such that said computing device can control data transfer connections made in said communications network;

activating software in said computer to select an appropriate one of said software drivers for the telephone system and cable being used, the software operating to cause transmissions on said digital telephone control lines to perform a data transfer connection control function using the connected telephone terminal.

27. A portable computer system for transmitting data over one of at least two types of public communications networks, each selectively accessible through an associated communications network access device connectable to the system, comprising:

computer means for generating and receiving a computer data set to be transferred to a remote computing device over the communications network access device;

modem means connected to the computer means for interfacing said computer means to the communications network access device for transfer of said computer data set;

tip-and-ring interface means connected to the modem means and to an external connector of the portable computer system for transmitting and receiving said computer data set in a standard landline tip and ring telephone signal format;

receive-and-transmit interface means connected to the modem means and to an external connector of the portable computer system for transferring said computer data set in digital form on separate receive lines and transmit lines; and control means for activating said tip and ring interface means at least when said data set is to be transferred using a standard landline telephone protocol and for activating said receive-and-transmit interface means at least when said data set is to be transferred using a digitized transmission radio communications network.

28. The portable computer system of claim 27, wherein said computer means is contained in a unitary housing and said modem means is installed within the housing.

29. The portable computer system of claim 28 wherein said tip-and-ring interface means and said receive-and-transmit interface means are connected to the same external connector of said portable computer system.

30. The portable computer system of claim 28 wherein said tip-and-ring interface means and said receive-and-transmit interface means are each connected to a different external connector of said portable computer system.

31. The portable computer system of claim 30 wherein said tip-and-ring interface means and said receive-and-transmit interface means are each connected to standard telephone connectors.

32. The portable computer system of claim 31 wherein said tip-and-ring interface means is connected to an RJ-11 connector and said receive-and-transmit interface means are connected to an RJ-45 connector.

33. The portable computer system of claim 27 further including digital telephone control means for generating communications network access device control signals, said digital telephone control means connected to an external connector of said portable computer system.

34. The portable computer system of claim 33 wherein said digital telephone control means includes a processing program fixed in a nonvolatile digital data recording medium which causes the digital telephone control means to generate signals at said external connector connected to said digital telephone control means to control the operation of at least one specific predetermined digitally controlled telephone network access device when said device is connected to said external connector through a cable having a predetermined configuration.

35. A portable computer modem for transferring a data set between a portable computer and a remotely located computing device over one of at least two types of public communications networks, each public communications network selectively accessible through an associated communications network access device connectable to the system, comprising:

computer connecting means for making a data transfer connection of the modem to the portable computer;

connector means for connecting the modem to said associated communications network access device and providing receive line and transmit line connections of the modem to said associated communications network access device;

modulation means connected to the computer connecting means t:or selectively converting digital data signals, received from the portable computer and representing said data set, to analog signals, and for convening analog data set signals received from said communications network access device to digital data signals;

receive-and-transmit interface means connected to the modulation means and to said external connector means for transmitting and receiving said analog signals on said receive and transmit lines;

digital interface control means operably connected to said computer connecting means and further connected to said receive and transmit lines for selectively transferring digital data set signals in unmodulated form between said portable computer and said remotely located computing device through said communications network access device.

36. A portable computer modem for transferring data between a portable computer and one of at least two types of public communications networks, each public communications network selectively accessible through an associated communications network access device connectable to the modem, comprising:

computer connecting means for making a data transfer connection of the modem to the portable computer;

external connector means for connecting the modem to said associated communications network access device and providing separate receive line and transmit line connections of the modem to said associated communications network access device;

modulation means connected to the computer connecting means for selectively convening digital data signals received from the portable computer to analog signals, and for convening analog signals received from said communications network access device to digital data signals;

receive-and-transmit interface means connected to the modulation means and to said external connector means for transmitting and receiving said analog signals on said separate receive lines and transmit lines;

control means connected to said modulation means and said computer connecting means for controlling the operation of the modulation means through said receive-and-transmit interface means; and level control means connected to said control means and said receive line for selectively driving said receive line with a DC voltage under the control of said control means.

37. The modem of claim 36 wherein said level control means is connected to said transmit line and further operates to drive said transmit line with a DC voltage level under the control of said control means.

38. A portable computer modem for transferring a data set between a portable computer and a remotely located computing device through one of at least two types of public communications networks, each public communications network selectively accessible through an associated communications network access device connectable to the modem, comprising:

computer connecting means for making a data transfer connection of the modem to the portable computer;

external connector means external to a housing containing at least the modem for connecting the modem to said associated communications network access device and providing separate receive line and transmit line connections of the modem to said associated communications network access device;

modulation means connected to the computer connecting means for selectively converting digital data signals representing the data set and received from the portable computer to analog signals, and for converting analog signals received from said communications network access device to digital data signals representing a received data set;

receive-and-transmit interface means connected to the modulation means and to said external connector means for transmitting and receiving said analog signals representing the data set on said separate receive lines and transmit lines;

control means connected to said modulation means and said computer connecting means for controlling the operation of the modulation means to transmit the data set through said receive-and-transmit interface means; and level sensing means connected to said control means and said receive line for selectively sensing the voltage level of said receive line under the control of said control means.

39. The modem of claim 38 wherein said level sensing means is connected to said transmit line and further operates to selectively sense the voltage level of said transmit line under the control of said control means.

40. A portable computer modem for transferring a data set between a portable computer and a remotely located computing device through one of at least two types of public communications networks, each public communications network selectively accessible through an associated communications network access device connectable to the modem, comprising:

computer connecting means for making a data transfer connection of the modem to the portable computer;

external connector means external to a housing containing at least the modem for connecting the modem to said associated communications network access devices and providing separate receive line and transmit line connections and tip-and-ring connections of the modem to at least one said associated communications network access device;

modulation means connected to the computer connecting means for selectively converting digital data signals representing the data set and received from the portable computer to analog signals, and for converting analog signals received from said communications network access device to digital data signals;

receive-and-transmit interface means connected to the modulation means and to said external connector means for transmitting and receiving said analog signals representing said data set on said separate receive lines and transmit lines;

tip-and-ring interface means connected to the modulation means and to said external connector means for conveying said analog data set signals to a standard landline tip and ring telephone signal format for transmission and for conveying received tip and ring telephone signals to said analog signals.

41. The modem of claim 40 wherein said external connection means comprises a single external connector connected to said tip-and-ring interface means and said receive-and-transmit interface means.

42. The modem of claim 40 wherein said external connection means comprises two external connectors, a first connector connected to said tip-and-ting interface means and a second connector connected to said receive-and-transmit interface means.

43. The modem of claim 42 wherein said first and second connectors are standard telephone connectors.

44. The modem of claim 43 wherein said first connector is an RJ-11 connector and said second connector is an RJ-45 connector.

45. The modem of claim 40 further including digital telephone control means for generating communications network access device control signals, said digital telephone control means connected to said external connector means of said modem.

46. The modem of claim 45 wherein said digital telephone control means includes a processing program fixed in a nonvolatile digital data recording medium which causes the digital telephone control means to generate signals at said external connector means connected to said digital telephone control means to control the operation of at least one specific predetermined digitally controlled telephone network access device when said device is connected to said external connector through a cable having a predetermined configuration.

47. The modem of claim 46 wherein said digitally controlled telephone network access device is a cellular radiotelephone.

48. A portable computer system adapted for transferring data over a radio communications network when directly connected to a specific radio network access device having a specific external connector for allowing external control of the radio network access device, comprising:
   a transportable computer housing;
   computer means mounted within said computer housing for processing data transferrable over a radio network access device;
   modem means operably connected to the computer means and mounted substantially within said transportable computer housing for transferring data between said computer means and a remote data transfer device over a radio network access device, said modem means comprising,
   data pump means for transferring data between the modem means and a radio network access device;
   receive and transmit data lines operatively connected to said data pump means to provide a receive and transmit line interface for carrying data between the modem means and a radio network access device;
   control signal lines programmable to carry control signals for controlling and/or monitoring the operation of different types of radio network access devices; and
   program controllable modem controller means connected to said computer means, said control signal lines, and said data pump means for controlling the operation of said modem means in response to a modem control program to permit the control of a call placement function of a specific type of radio network access device by said modem:
   jack means mounted on said transportable computer housing and connected to said control lines and said receive and transmit data lines, for providing an external connection of said receive and transmit line interface to connect said modem means with a plurality of types of radio network access devices;
   matched program and cable means corresponding to a specific radio network access device for connecting and controlling the computer system to transfer data over a radio communications network upon connection with said specific radio network access device, said matched program and cable means including
      a device specific multi-line cable means for interconnecting at one end with said jack means and connectable at the other end with a device specific external connection of said specific radio network access device to interconnect said receive and transmit data lines and said control lines with said specific external connector of the radio network access device; and
      program means for programming said modem controller means to cause said control lines to function in a manner suitable only for the specific radio network access device with which said cable means is adapted to be connected.

49. A kit for programming and connecting a computer connected, programmable modem to one of a plurality of different types of cellular telephones having different control protocols, respectively, for controlling phone functions and having different external electrical connectors, respectively, to receive external control signals formatted in accordance with the control protocols for controlling cellular phone operation to allow data to be transferred and received by the computer over a cellular network, comprising
   a cellular telephone cable means for interconnecting a specific one of the cellular telephones to the modem, said cellular telephone cable means including a conductive cable having a modem connector at one end for connection with the modem and a cellular telephone connector at the other end for connection with the specific external electrical connector of one of the plurality of cellular telephones, and
   a non-volatile digital data recording medium containing a software driver adapted to be loaded into the programmable modem for causing the modem to produce control signals in accordance with a control protocol of said specific cellular telephone using said conductive cable.

50. A method of upgrading a programmable interface device which drives a radio network interface device for transfer of a data set between the programmable interface device and a remotely located computing device over a radio network, so that the programmable interface device will drive a specific new radio network interface device, comprising the steps of:
   providing a programmable interface device with a memory for storing one or more software drivers and a common connection means for transferring data signals between the programmable universal interface device and said radio communications network interface devices;

providing a driver kit including a cable for connecting the common connection means to at least one specific radio communications network interface device through one or more line connections and a software driver containing information for controlling the operation of the specific radio communications network interface device, said software driver information including information assigning particular control signal transmissions to particular said one or more line connections established by the cable;

installing the cable from the driver kit between the programmable interface device and the radio communications network interface device to establish at least one data transmission line connection between the programmable interface device and the radio communications network interface device;

installing the software driver from the software driver kit in a storage memory of the programmable interface device;

activating the programmable interface device to select said software driver to control operation of said specific radio communications network interface device by generating control signal transmissions and selectively routing said signals to line connections established by the cable to control said radio communications network interface device for establishing data transfer connections in said radio communications network to define the identity of the remotely located computing device.

51. The method of claim 50 wherein the programmable interface device comprises a portable computing device.

52. The method of claim 51 wherein the common connection means comprises an external jack on the portable computing device.

53. The method of claim 52 wherein the external jack comprises a serial digital data port.

54. The method of claim 51 wherein the programmable interface device comprises a data modem.

55. The method of claim 54 wherein the data modem comprises a microprocessor connected to control a plurality of data transfer interfaces operable with different and further connected to control a plurality of programmable control lines connected to said network interface device by said cable.

56. The method of claim 50 wherein the programmable interface device comprises a microprocessor connected to control a plurality of data transfer interfaces having different configurations and operable with different radio communications networks.

57. The method of claim 56 wherein the microprocessor further controls a plurality of programmable control lines connected to said radio communications network interface device by said cable.

58. The method of claim 56 wherein said data transfer interfaces include at least an analog modulated RX-TX interface and a digital RX-TX interface.

59. The method of claim 50 wherein the programmable interface device comprises a microprocessor that formats the data set for transmission.

60. The method of claim 59 wherein the microprocessor formats the data set into data blocks for transmission.

61. A system for transferring data between a computing device and a remote device using a selected one of a plurality of communications network access devices including at least one radio communications network access device, comprising:

a data transmission and formatting circuit connected to said computing device and further connectable by at least one of a receive line and transmit line interface and a tip and ring line interface to one of said communications network access devices for transferring data between said computing device and a remote data transfer device over said connected communications network access device, said data transmission and formatting circuit operating selectively to transfer digital data between the computing device and the remote data transfer device in one of at least two modes depending on the type of communications network access device in use: a first mode using said receive line and transmit line interface to transfer a signal representing digital data, and a second mode using said tip and ring interface to transfer an analog signal representing digital data, said data transmission and formatting circuit comprising:

controller means connected to said computer means for controlling the mode of operation of said data transmission and formatting circuit and for controlling destination addressing functions of said connected communications network access devices in response to a software driver; and memory means connected to said controller means for storing one or more of said software drivers, each including data specific to at least one particular communications network access device for use by said controller means in selecting an appropriate one of said modes of operation of the data transmission and formatting circuit and generating appropriate destination addressing control commands specific to said particular communications network access device for establishing transmission between said computing device and said remote data transfer device; and a data communications program operating in the computing device for accessing one of a plurality of said software drivers and thereafter selectively downloading one or more of said software drivers to said memory means for subsequent use in transferring data using an associated communications network access device connected to said data transmission and formatting circuit.

62. A kit for upgrading a programmable interface device which drives a radio network interface device for transfer of a data set between the programmable interface device and a remotely located computing device over a radio network, so that the programmable interface device will drive a specific new radio network interface device, comprising:

providing a programmable interface device with a memory for storing one or more software drivers and a common connection means for transferring data signals between the programmable universal interface device and said radio communications network interface devices;

a cable connecting a common connection means of the programmable interface device which transfers data signals between the programmable interface device and said radio communications network interface device to at least one specific radio communications network interface device through one or more line connections; and a software driver containing information for controlling the operation of the specific radio communications network interface device, said software driver information including instructions for generating control signal transmissions for establishing data transfer connections in said radio communications network to define the identity of the remotely located computing device, and further including instructions for selectively routing particular control signal transmissions to particular line connections established by the cable, said software driver installable in a storage memory of the programmable interface device.

63. The kit of claim 62 wherein the programmable interface device comprises a data modem and the software driver comprises programming information loaded into a storage memory of the data modem to control the operation of the data modem.

64. A portable computer modem system for transferring a data set between a portable computer and a remotely located computing device through one of at least two types of radio communications networks, each radio communications network selectively accessible through an associated radio network access device connectable to the modem, comprising:

computer connecting means for making a data transfer connection of the modem to the portable computer;

external connector means external to a housing containing at least the modem for connecting the modem to said associated radio network access device and providing separate receive line and transmit line connections of the modem to said associated radio network access device;

modulation means connected to the computer connecting means for selectively converting digital data signals representing the data set and obtained from the portable computer to analog signals, and selectively converting analog signals received from said radio network access device to digital data signals representing a received data set;

receive-and-transmit interface means connected to the modulation means and to said external connector means for transmitting and receiving signals representing the data set on said separate receive lines and transmit lines; and control means connected to said modulation means and said receive and transmit interface means for selectively controlling the modulation means and the receive and transmit interface means to transfer the data set between the computing device and the remote data transfer device in one of at least two modes, the selected mode depending on the type of radio network access device in use: a first mode in which said control means digitally formats said data set according to a transmission protocol and digitally transmits the formatted data set to the radio network access device over the receive and transmit interface, and a second mode in which said control means digitally formats said data set according to a transmission protocol, and activates said modulation means to modulate said formatted data set and transmit a modulated formatted analog data signal representing the formatted data set to the receive and transmit interface and thus to the radio network access device and the remote computing device.

65. The modem system of claim 64 wherein the same said receive lines and transmit lines are used in both said first and second operating modes.

66. The modem system of claim 64 wherein the transmission protocol in the second mode comprises separating the data set into packets and adding error detection formatting to the packets.

* * * * *